Figure 1:
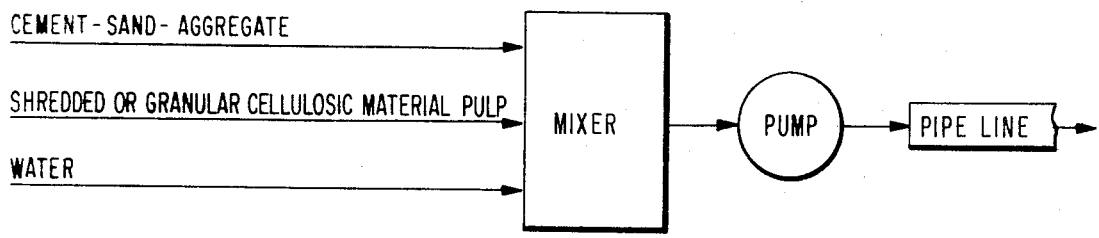

United States Patent [19]
Nutt

[11] 3,753,749
[45] Aug. 21, 1973

[54] CONCRETE COMPOSITIONS

[75] Inventor: William Owen Nutt, Warlingham, England

[73] Assignee: The Cement Marketing Company Limited, London, England

[22] Filed: Aug. 12, 1971

[21] Appl. No.: 171,351

Related U.S. Application Data

[63] Continuation-in-part of Ser. No. 41,305, May 28, 1970, abandoned.

[52] U.S. Cl.................... 106/93, 106/99, 137/13
[51] Int. Cl.................................................. C04b 7/02
[58] Field of Search...................... 106/93, 99, 90; 137/13

[56] References Cited
UNITED STATES PATENTS

| | | | |
|---|---|---|---|
| 3,465,824 | 9/1969 | Kucera | 106/93 |
| 3,245,814 | 4/1966 | Dunlap et al. | 106/93 |
| 3,215,549 | 11/1965 | Ericson | 106/93 |
| 2,985,239 | 5/1961 | Shell | 106/93 |
| 2,880,096 | 3/1959 | Hurley | 106/93 |
| 2,517,993 | 8/1950 | Falco | 106/93 |
| 2,320,633 | 6/1943 | Mitchell et al. | 106/93 |

OTHER PUBLICATIONS

Taylor, W. H. "Concrete Technology and Practice" American Elsevier, pgs. 348-351, (1965).

*Primary Examiner*—Delbert E. Gantz
*Assistant Examiner*—James W. Hellwege
*Attorney*—Baldwin, Wight & Brown

[57] ABSTRACT

In concrete compositions based on hydraulic cement, improved properties in respect of workability, especially mouldability, capacity for being impelled along a pipe as by pumping, and frost resistance in the concrete, are obtained by incorporating in the composition a minor proportion of dispersed cellulose fibres such as paper making fibres.

7 Claims, 3 Drawing Figures

CONCRETE COMPOSITIONS

This is a continuation-in-part application of an application of William Owen Nutt entitled PUMPABLE CONCRETE, Ser. No. 41,305, filed May 28, 1970, now abandoned.

The present invention relates to the composition of concrete, particularly concrete based on Portland cement. More particularly the invention is concerned with cement compositions for forming concrete, having improved properties resulting from the incorporation of fibrous material.

The components of a cement composition intended for concrete formation are selected and proportioned with a view to obtaining those properties considered to be important in relation to the particular purpose of the concrete. These properties may for example include the capacity to be readily moulded or otherwise handled especially by machinery or conveying appliances, and the ability to withstand ambient conditions such as the effects of frost. Measures adopted to meet such requirements are not always reconcilable with one another.

Concrete compositions for roads, aircraft runways and similar pavements, which we refer to as paving quality concrete, are required to withstand the deleterious effects of freezing and thawing. The requirements of concrete mix design adopted hitherto to withstand freezing and thawing are well-known; the basic necessity to reduce porosity by a mix design which maintains a relatively low ratio of water to cement is well understood. In practice, however, the workability requirements of pavement laying machines often prevent achievement of this objective and in consequence an alternative method is widely adopted by which a proportion of air is entrained within the concrete. Air-entrained concrete normally requires 5 percent by volume of air in the mix which is induced to form and remain stable during placement by the use of surface active additives in the water phase.

By the addition of additives of this type, some reduction in strength of the ultimate cement matrix is induced and strength is further reduced by virtue of the inclusion of the air bubbles which in themselves do not contribute to strength.

In another aspect of concrete preparation, in the use of concrete for large scale engineering works, it is often convenient to centralise the concrete batching plant and its attendant aggregate bunkers, cement silos, services and so forth and to transport the concrete composition so produced to the site of placement by one means or another. The economics of providing pumping machinery and pipe lines is often found attractive in comparison with the use of individual dumper trucks or skips hoisted by tower crane, as a means of transporting the concrete from the batching plant into the shuttering or placement.

As a means of transport, however, pumping places limitations on the mix design of the concrete by virtue of the requirement for the produced concrete to possess self-lubricating properties to enable free passage through the pump and pipe-lines. It is often the case that the largest volumes of concretes for placement on any given engineering project are those required for the foundations onto which the engineering structure is then constructed; this class of concrete can be designed to the required engineering strengths economically by the use of relatively lean mix design, that is to say with low cement content, lean mix design, that is to say with low cement content, but such concrete compositions are invariably too rich in aggregate to permit satisfactory placement by pumping. Thus the overall economics of a pumping station for concrete placement on a comprehensive building site can depend on whether an economic mix design for the foundation concrete can be pumped.

A typical concrete mix design in the class used for mass foundations would consist of the nominal volume proportions 1:4:8, of cement:sand:graded aggregate. Such a mix provides the designed strength requirements for its use but it is a "harsh" mix and is not capable of being pumped due to inadequate lubrication by fine aggregate, cement and water, of the surface area of the large size aggregate content. In order to pump such a mix it is necessary to increase either the sand or the cement content or both, relative to the coarse aggregate, to an extent which proves uneconomic in material costs.

In many applications of concrete compositions, moreover, it is desirable to provide compositions having good moulding properties over a wide range of component proportions varied to suit particular strength or other requirements.

It is an object of the present invention to provide concrete compositions having improved properties by the incoporation of an additive material therein.

It is another object of the invention to provide a frost-resistant paving concrete without impairment of strength.

It is a further object of the present invention to provide an additive for concrete compositions which, by virtue of their mix design, cannot otherwise be pumped for placement economically, and thereby to enable their placement by pumping.

It is a still further object of the present invention to provide concrete compositions of improved workability, particularly improved moulding properties.

We have now found that the dispersion of a minor proportion of cellulose fibres in a concrete mix fulfils the aforesaid objects. In particular the incorporation of cellulose fibres in a concrete mix provides a lubricating effect for the surface of the particles of large aggregate material and enables such modified concrete to be pumped without the necessary increase of either the sand, cement or water proportion. Such a concrete composition containing cellulose fibres offers improved workability properties, particularly an improved capacity for moulding and is moreover found to perform at least comparably in resistance to freezing and thawing cycles, to air-entrained concrete.

According to the present invention a concrete composition comprises cement, aggregate material and a minor proportion based on the weight of cement, of cellulose fibres. The invention also embraces a method of forming a concrete composition which comprises mixing together cement, aggregate material, a minor proportion of cellulose fibres by weight base on the cement, and water.

Cellulose fibres which are suitable for this application are found within the wide range of natural cellulose fibre materials regardless of whether the source is from coniferous or deciduous trees, grasses or plants such as hemp, mailla, jute or flax. Such fibres are generally characterised in being suitable for paper making, so that the addition of suitable paper in pulp form to a lean concrete mix enables such concrete to be pumped and to resist the effects of frost and to afford improved mouldability properties.

In order to obtain the maximum advantage in the practice of the present invention, the cellulose fibre must be distributed uniformly throughout the concrete mix and a number of means are available to achieve this requirement, for example, the fibres can be milled or otherwise mechanically prepared so as to permit ready dispersion throughout the concrete by normal mixing; or the fibre can be added to the cement at the normal grinding stage of cement manufacture so as to be evenly distributed; or the fibre can be dispersed as pulp into the water used for gauging the concrete mix.

Whichever method of addition is used, the objective is to disperse the fibre throughout the concrete mix so that discrete fibres are homogeneously distributed. The invention is not limited with respect to the means of dispersion employed.

Figure 2:
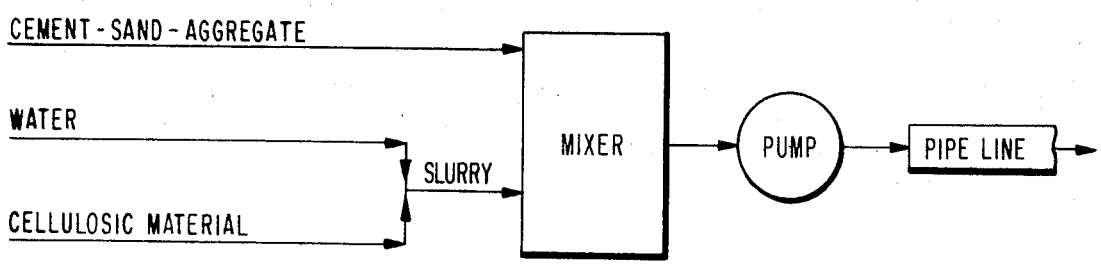
Figure 3:
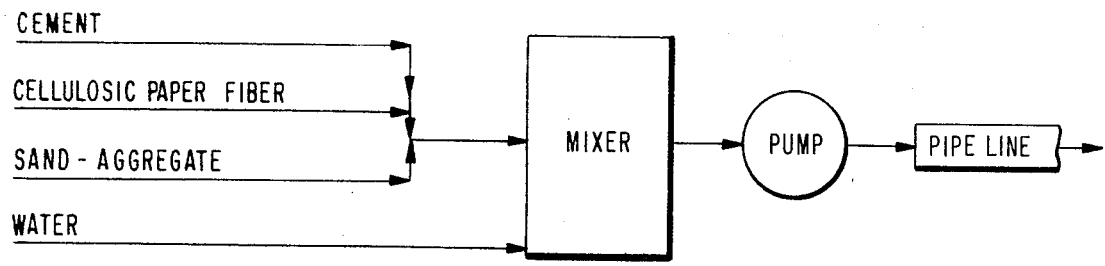

In the drawings, FIGS. 1, 2 and 3 are flow sheets depicting the procedures identified in the foregoing paragraphs.

When the cellulose fibre is provided by the incorporation of paper material, the latter should preferably meet the two following requirements. Firstly the paper should readily disperse into the concrete during the normal mixing time allowed in the concrete mixer and secondly the paper should have a fibre length which permits adequate dispersion in the aqueous phase of the concrete to enable its distribution throughout the matrix and onto the surface of the coarse aggregate particles. Good results have most frequently been obtained with a fibre length preferably not exceeding 3 mm.

The incorporation of fibre increases the overall specific surface area of the concrete mix and this in turn limits the quantity of fibre it is practical to include in the mix. This is because with increasing specific surface area the concrete mix demands higher ratios of water to cement in order to achieve practical workability. Each fibre appears to have specific properties in this respect and the following Examples illustrate the effects of fibre additions.

MIX 1:
  Normal concrete control mix
  4 parts by weight coarse river flint aggregate
  2 parts by weight river sand.
  1 part by weight ordinary Portland cement.
  Water to provide a water/cement ratio of 0.6.

MIX 2:
  As mix 1 but with a normal commercially available air entraining agent containing ionic and non-ionic surfactants added at the rate of 1 per cent by weight based on the cement. This mix typifies normal air-entrained concrete.

MIX 3:
  As mix 1 but including the addition of 2 percent by weight on the cement content of a fibre prepared from coniferous wood pulp as manufactured for white paper making and comminuted dry in a hammer mill to provide an average fibre length of 2 mm. This pulp was added dry to the dry components of the mix and distributed throughout the concrete composition prior to the addition of water.

MIX 4:
  As mix 3 but with additional water to provide a comparable workability to mix 1.

The following workability measurements were established.

| In accordance with BS. 1881:1970 testing Procedures | MIX 1 | MIX 2 | MIX 3 | MIX 4 |
| --- | --- | --- | --- | --- |
| Compacting factor | 0.92 | 0.95 | 0.75 | 0.89 |
| Slump | ¾" | 3½" | Nil | ¾" |
| Vebe consistometer | 4 sec. | 1.5 sec. | 40 sec. | 6 sec. |

The following compressive strength results were obtained by crushing 4 inch cubes (average of 3 per test) cured in accordance with the conditions nominated in BS. 12:1958.

| | MIX 1 | MIX 2 | MIX 3 | MIX 4 |
| --- | --- | --- | --- | --- |
| lbf/in$^2$ 7 days age | 4850 | 3800 | 4250 | 4200 |
| lbf/in$^2$ 28 days age | 5650 | 4950 | 5750 | 3300 |

From these results it will be observed that the inclusion of air in MIX 2 reduces its strength over MIX 1 whereas the inclusion of fibre in MIX 3 does not significantly reduce its strength over MIX 1 and materially improves its strength over MIX 2; the strengths quoted for MIX 4 illustrate the effect of high water/cement ratio in comparison with MIX 3. However, the above cube strengths should be read in conjunction with the density of the concretes produced which were tested to give the following results.

| | MIX 1 | MIX 2 | MIX 3 | MIX 4 |
| --- | --- | --- | --- | --- |
| Density lb/ft$^3$ | 148.75 | 144.5 | 148.25 | 144.25 |

From these it will be observed that MIXES 1 and 3 are comparable whereas MIX 2 by inclusion of its air has a lower density than the control mix.

Tests were conducted to establish the air content using an air meter, following BS. 1881:1970 Testing Procedures.

| | MIX 1 | MIX 2 | MIX 3 | MIX 4 |
| --- | --- | --- | --- | --- |
| Air Content % | 0.8 | 4.0 | 1.9 | 1.1 |

Although the cited procedure does not contemplate fibre inclusion, these results clearly indicate the higher air content of MIX 2 which is not of the same order indicated for MIX 3 containing fibre.

Cubes moulded from the above mixes were subjected to a series of freezing and thawing cycles in an attempt to establish the the frost resistance of the concrete. The tests commenced when the concrete cubes had been cured under water for 7 days. Initially the method of test entailed freezing at minus 10° C for 24 hours cubes which were immersed in trays of water to half their depth. The frozen trays were then thawed at room temperature (18° C) for 24 hours; this procedure constituted one cycle.

After 15 cycles of the above test no signs of deterioration of the surface of the specimens were apparent. The specimens were therefore treated more severely by being thawed in an oven at 80° C for 24 hours instead of thawing at room temperature. After 12 such cycles specimens from Concrete MIX 4 began to show signs of deterioration to an extent which was ajudged to represent severe spalling of the surface of a concrete pavement. After a further 30 cycles specimens from Concrete Mixes 1, 2 and 3 were examined; by this time these specimens had received 15 cycles of the first described test and 42 cycles of the more severe second test. Specimens from MIX 1 showed spalling at the edges and corners to a degree greater than specimens from MIXES 2 and 3, particularly specimens from MIX 3 showed no sign of deterioration. The most reliable indications are that concrete made from MIX 3 would not provide worse performance in practice than concrete made from MIX 2. Concrete made from MIX 2 is known to perform satisfactorily in general application once allowance has been made in its design use for the reduced strength and density resultant upon its air entrainment.

The conclusion is therefore that fibre inclusion in pavement quality concrete enables full concrete density and strength to be achieved whilst still affording protection against freezing and thawing. This aspect has material significance in the design of adequately durable concrete roads, aircraft runways and similar paved areas.

When considering the incorporation of cellulose fibre in a concrete composition in order to render the composition pumpable, and using cellulose fibre in the form of a paper material, the proportion of paper necessary to achieve pumpability depends on a number of factors amongst which are the particle shape of the coarse aggregates in the mix, the grading envelope of the sand proportion in the mix, the ratio of fines in the mix, that is to say those particles from the sand component and from the cement component which when mixed with the water form a thixotropic slurry which becomes dispersed over the surface of the coarser grain components in the mix; and finally, the ratio of water to cement.

In general, the suitability of particular paper fibres for individual concrete compositions is readily determined in practice. Tissue paper and other papers which disintegrate rapidly when beaten in water are widely applicable in the practice of the present invention.

For most purposes the mean fibre content to fulfil the objects of the present invention is preferably between 0.2 per cent and 5 per cent by weight based on the cement content of the concrete composition. An amount of about 0.8 per cent by weight fibre based on the cement content of the composition, or about 2 per cent by weight fibre based on the water content of the wet composition, is most satisfactory for many purposes.

The following Example is given by way of illustration, of the formation of a concrete composition having advantageous pumpability characteristics.

EXAMPLE

A particular concrete specification which called for a nominal volume mix design of 1:4:8, of cement:sand:stone, could only be placed according to the prior art when formed from the following mix composition:

| | |
|---|---|
| Cement | 215 lb. |
| Sand containing 7% moisture | 643 lb. |
| Crushed stone graded below ¾ inch and containing 1% moisture by weight | 985 lb. |
| Water | 85 lb. |

This provided a nominal mix volume proportion of 1:2.5:4.5, which is obviously uneconomic in comparison with calculations based on the nominal 1:4:8 composition. However, a mix suitable for placement by pumping was composed as follows, representing a nominal mix volume proportion close to the original specification (1:4:7.5):

| | |
|---|---|
| Cement | 130 lb. |
| Sand containing 7% moisture | 643 lb. |
| Crushed stone graded below ¾ inch and containing 1% moisture by weight | 985 lb. |
| Tissue paper | 1½ lb. |
| Water | 70 lb. |

It has further been found that the addition of cellulose fibre to concrete mixes which are currently considered to be capable of pumping, improves their pumping transport characteristics. In a typical site installation by which a standard 1:2:4 concrete mix was being pumped, the addition of tissue paper fibre as described reduced the power required by the pump to transport the concrete through the pipe-line, by 10 to 20 percent. Similarly sand/cement mortars and comparable compositions used for screeds, plasters and mortars are more easily pumped through narrow bore distribution lines when paper fibres are incorporated as described above. It will be appreciated that the invention thus provides for substantial reduction of the power required to transfer a concrete mix through a pipe-line, whether in the sense of thereby making such transfer possible or merely rendering it easier.

In a broad aspect, therefore, the invention provides a method of transporting a concrete mix from a mixing site to a placement site which comprises dispersing in said mix a minor proportion of a cellulosic material in segregated fibre form whereby the power required to transfer said mix through a pipe-line is reduced and thereafter conveying the fibre-modified mix through a pipe.

In general, the incorporation of cellulose fibres according to the present invention is beneficial in varying respects and degrees when applied to any concrete making composition. That is to say the invention applies widely to compositions containing ingredients to form concrete in any proportions whatever, such as hydraulic cement and relatively fine aggregate or sand and relatively coarse aggregate. Benefits are obtained whether the product is to be utilised in the form of structural material, as a mortar or as a surfacing material or in any other form. Thus although the proportions of ingredients will be predetermined in a manner conventional in the art and according to well-known factors depending on the end use, the invention is in no way limited in respect of proportions within the range of concrete making compositions, to which a minor proportion of cellulose fibres is to be added.

We claim:

1. A cementitious concrete-making composition consisting essentially of Portland cement, sand and coarser stone aggregate material in the respective proportions by volume of from about 1 : 2 : 4 to about 1 : 4 : 8, together with from about 0.2 percent to about 5 percent by weight based on the weight of the cement, of dispersed cellulose fibers having a length of below about 3 mm. which are insoluble in said concrete-making composition so as to retain their fibrous state.

2. A cementitious composition according to claim 1 wherein the cellulose fibers are paper fibers.

3. A composition according to claim 2 wherein the cellulose fibers are tissue paper fibers having a mean fiber length of from about 1 to about 3 millimeters.

4. Concrete consisting essentially of hardened Portland cement, sand and coarser stone aggregate material in the respective proportions by volume of from about 1 : 2 : 4 to about 1 : 4 : 8, and from about 0.2 percent to about 5 percent by weight based on the cement, of dispersed cellulose fibers having a length of below about 3 mm. which are insoluble in a wet concrete mix so as to retain their fibrous state.

5. The method of transporting a concrete-making composition consisting essentially of Portland cement, sand and coarser stone aggregate material in the respective proportions by volume of from about 1 : 2 : 4 to about 1 : 4 : 8, from a mixing site to a placement site through a pipeline, which method comprises dispersing in said concrete-making composition from about 0.2 percent to about 5 percent by weight based on the weight of the cement, of segregated cellulose fibers which are insoluble in said concrete-making composition so as to retain their fibrous state, whereby the mechanical power required to transfer said composition through said pipeline is reduced, and thereafter impelling the fiber-containing composition through said pipeline.

6. The method of claim 5 wherein the cellulose fibers are paper fibers.

7. The method of claim 6 wherein the paper fibers are paper tissue fibers having a mean fiber length of from about 1 to about 3 mm.

* * * * *